(12) United States Patent
Iwamura et al.

(10) Patent No.: US 7,269,274 B2
(45) Date of Patent: Sep. 11, 2007

(54) DIGITAL WATERMARK EMBEDDING METHOD, DIGITAL WATERMARK EXTRACTION METHOD, DIGITAL WATERMARK EMBEDDING APPARATUS, AND DIGITAL WATERMARK EXTRACTION APPARATUS

(75) Inventors: Keiichi Iwamura, Kanagawa (JP); Kitahiro Kaneda, Kanagawa (JP); Jun Tamaru, Tokyo (JP); Takami Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 752 days.

(21) Appl. No.: 10/727,637

(22) Filed: Dec. 5, 2003

(65) Prior Publication Data

US 2004/0142096 A1    Jul. 22, 2004

(30) Foreign Application Priority Data

Dec. 9, 2002    (JP)    ............................. 2002-356741

(51) Int. Cl.
G06K 9/00    (2006.01)
G06K 9/34    (2006.01)
G06K 15/00    (2006.01)

(52) U.S. Cl. ................. 382/100; 382/177; 358/3.28
(58) Field of Classification Search ................ 382/100, 382/174, 175, 177; 358/3.28
See application file for complete search history.

(56) References Cited

U.S. PATENT DOCUMENTS 5,629,770 A    5/1997    Brassil et al. .......... 358/426.12
5,680,479 A    10/1997    Wang et al.

(Continued)

FOREIGN PATENT DOCUMENTS

EP    0 660 275 A2    6/1995

(Continued)

OTHER PUBLICATIONS

Nopporn Chotikakamthorn, "Electronic Document Data Hiding Technique Using Inter-Character Space", The 1998 IEEE Asia-Pacific Conference on Circuits and Systems, 1998, pp. 419-422.

(Continued)

*Primary Examiner*—Andrew W. Johns
*Assistant Examiner*—Anthony Mackowey
(74) *Attorney, Agent, or Firm*—Fitzpatrick, Cella, Harper & Scinto

(57) ABSTRACT

An apparatus for embedding a digital watermark in a document image detects circumscribing outer shapes of characters in the document image and sets a plurality of reference lines that extend in the column direction and are spaced apart in the row direction by a basic pitch. The outer shapes include a first outer shape, a second outer shape that neighbors the first outer shape, and a third outer shape that neighbors the second outer shape, and the reference lines include a first reference line located between the first outer shape and the second outer shape, and a second reference line located between the second outer shape and the third outer shape. Control is performed for at least one of the second and third outer shapes so that a distance between the first reference line and an edge of the second outer shape is different from a distance between the second reference line and an edge of the third outer shape, in accordance with digital watermark information to be embedded.

12 Claims, 14 Drawing Sheets

U.S. PATENT DOCUMENTS

| | | |
|---|---|---|
| 5,745,600 A | 4/1998 | Chen et al. .................. 382/218 |
| 5,761,686 A | 6/1998 | Bloomberg .................. 715/529 |
| 5,861,619 A | 1/1999 | Horino et al. |
| 6,086,706 A | 7/2000 | Brassil et al. |
| 6,535,616 B1 | 3/2003 | Hayashi et al. |
| 6,731,775 B1 | 5/2004 | Ancin ........................ 382/100 |
| 2002/0104003 A1 | 8/2002 | Iwamura |
| 2003/0044043 A1 | 3/2003 | Kaneda |
| 2003/0149936 A1 | 8/2003 | Tamaru |
| 2003/0231786 A1 | 12/2003 | Iwamura et al. |
| 2004/0146199 A1 | 7/2004 | Berkner et al. ............. 382/176 |

FOREIGN PATENT DOCUMENTS

| | | |
|---|---|---|
| JP | A 6-068301 | 3/1994 |
| JP | A 9-186603 | 7/1997 |
| JP | B 3136061 | 12/2000 |

OTHER PUBLICATIONS

Yasuhiro Nakamura, et al., "Digital Watermarking Onto Japanese Documents By Seal Image", IPSJ Journal vol. 38, No. 11, Nov. 1997.

DIGITAL WATERMARK EMBEDDING METHOD, DIGITAL WATERMARK EXTRACTION METHOD, DIGITAL WATERMARK EMBEDDING APPARATUS, AND DIGITAL WATERMARK EXTRACTION APPARATUS

FIELD OF THE INVENTION

The present invention relates to a technique for embedding a digital watermark in a document image, and also to a technique for extracting the embedded digital watermark.

BACKGROUND OF THE INVENTION

As a copyright protection method used in distributing digital data such as image data, audio data, and the like on the Internet, digital watermarking attracts a lot of attention. Digital watermarking is a technique for embedding information so as to be imperceptible to a human being. For example, as a digital watermarking technique for a multi-valued image, various methods that exploit the redundancy of the density values of multi-valued pixels are known.

On the other hand, a binary image such as a document image has small redundancy, and it is difficult to apply the digital watermarking technique to such an image. However, some digital watermarking methods that exploit unique features of document images are known. For example, a method of shifting the baseline of a line (e.g., see Japanese Patent No. 3,136,061), a method of manipulating an inter-word space length (e.g., see U.S. Pat. No. 6,086,706 and Japanese Patent Laid-Open No. 9-186603 (U.S. Pat. No. 5,861,619)), a method of manipulating an inter-character space length (e.g., see "Electronic document data hiding technique using inter-character space", The 1998 IEEE Asia-Pacific Conf. On Circuits and Systems, 1998, pp. 419-422), a method of rotating a character to change its inclination (e.g., see Yasuhiro Nakamura & Kineo Matsui, "Digital Watermarking onto Japanese Documents by Seal Image", IPSJ Journal Vol. 38, No. 11, November 1997), and the like are known.

However, since a document image has small redundancy, and the conventional methods proposed so far embed information by changing two variables, i.e., the baseline of a line, inter-word space, or rotation of a character, the changed points stand out (i.e., image quality deteriorates considerably). For this reason, embedding of information in a document image may be detected by a third party.

SUMMARY OF THE INVENTION

The present invention has been made in consideration of the aforementioned problems, and has as its object to provide a technique that can embed a digital watermark data sequence in a document image while suppressing deterioration of the image quality.

In order to achieve the above object, for example, an apparatus of the present invention comprises the following arrangement.

That is, a preferred embodiment of an apparatus for embedding a digital watermark in a document image includes outer shape detection means for detecting circumscribing outer shapes of characters in a document image, the outer shapes including a first outer shape, a second outer shape that neighbors the first outer shape, and a third outer shape that neighbors the second outer shape. The apparatus further includes reference calculation means for setting a plurality of reference lines, the reference lines extending in a column direction and being spaced apart by a basic pitch in a row direction, the reference lines including a first reference line located between the first outer shape and the second outer shape and a second reference line located between the second outer shape and the third outer shape. The apparatus also includes control means for controlling at least one of the second and third outer shapes so that a distance between the first reference line and an edge of the second outer shape is different from a distance between the second reference line and an edge of the third outer shape, in accordance with digital watermark information to be embedded.

In order to achieve the above object, for example, a method of the present invention comprises the following arrangement.

That is, a preferred embodiment of a method for embedding a digital watermark in a document image includes an outer shape detection step of detecting circumscribing outer shapes of characters in a document image, the outer shapes including a first outer shape, a second outer shape that neighbors the first outer shape, and a third outer shape that neighbors the second outer shape. The method further includes a reference calculation step of setting a plurality of reference lines, the reference lines extending in a column direction and being spaced apart by a basic pitch in a row direction, the reference lines including a first reference line located between the first outer shape and the second outer shape and a second reference line located between the second outer shape and the third outer shape. The method also includes a control step of controlling at least one of the second and third outer shapes so that a distance between the first reference line and an edge of the second outer shape is different from a distance between the second reference line and an edge of the third outer shape, in accordance with digital watermark information to be embedded.

In order to achieve the above object, for example, an apparatus of the present invention comprises the following arrangement.

That is, a preferred embodiment of an apparatus for extracting a digital watermark embedded in a document image includes outer shape detection means for detecting circumscribing outer shapes of characters in a document image, the outer shapes including a first outer shape, a second outer shape that neighbors the first outer shape, and a third outer shape that neighbors the second outer shape. The apparatus further includes reference calculation means for setting a plurality of reference lines, the reference lines extending in a column direction and being spaced apart by a basic pitch in a row direction, the reference lines including a first reference line located between the first outer shape and the second outer shape and a second reference line located between the second outer shape and the third outer shape. The apparatus also includes extraction means for comparing a first distance, between the first reference line and an edge of the second outer shape, to a second distance, between the second reference line and an edge of the third outer shape, and extracting data corresponding to a comparison result of the distances as data embedded using the first and second distances.

In order to achieve the above object, for example, a method of the present invention comprises the following arrangement.

That is, a preferred embodiment of a method for extracting a digital watermark embedded in a document image includes an outer shape detection step of detecting circumscribing outer shapes of characters in a document image, the outer shapes including a first outer shape, a second outer shape that neighbors the first outer shape, and a third outer shape that neighbors the second outer shape. The method further includes a reference calculation step of setting a plurality of reference lines, the reference lines extending in a column direction and being spaced apart by a basic pitch in a row direction, the reference lines including a first reference line located between the first outer shape and the second outer shape and a second reference line located between the second outer shape and the third outer shape. The method also includes an extraction step of comparing a first distance, between the first reference line and an edge of the second outer shape, to a second distance, between the second reference line and an edge of the third outer shape, and extracting data corresponding to a comparison result of the distances as data embedded using the first and second distances.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
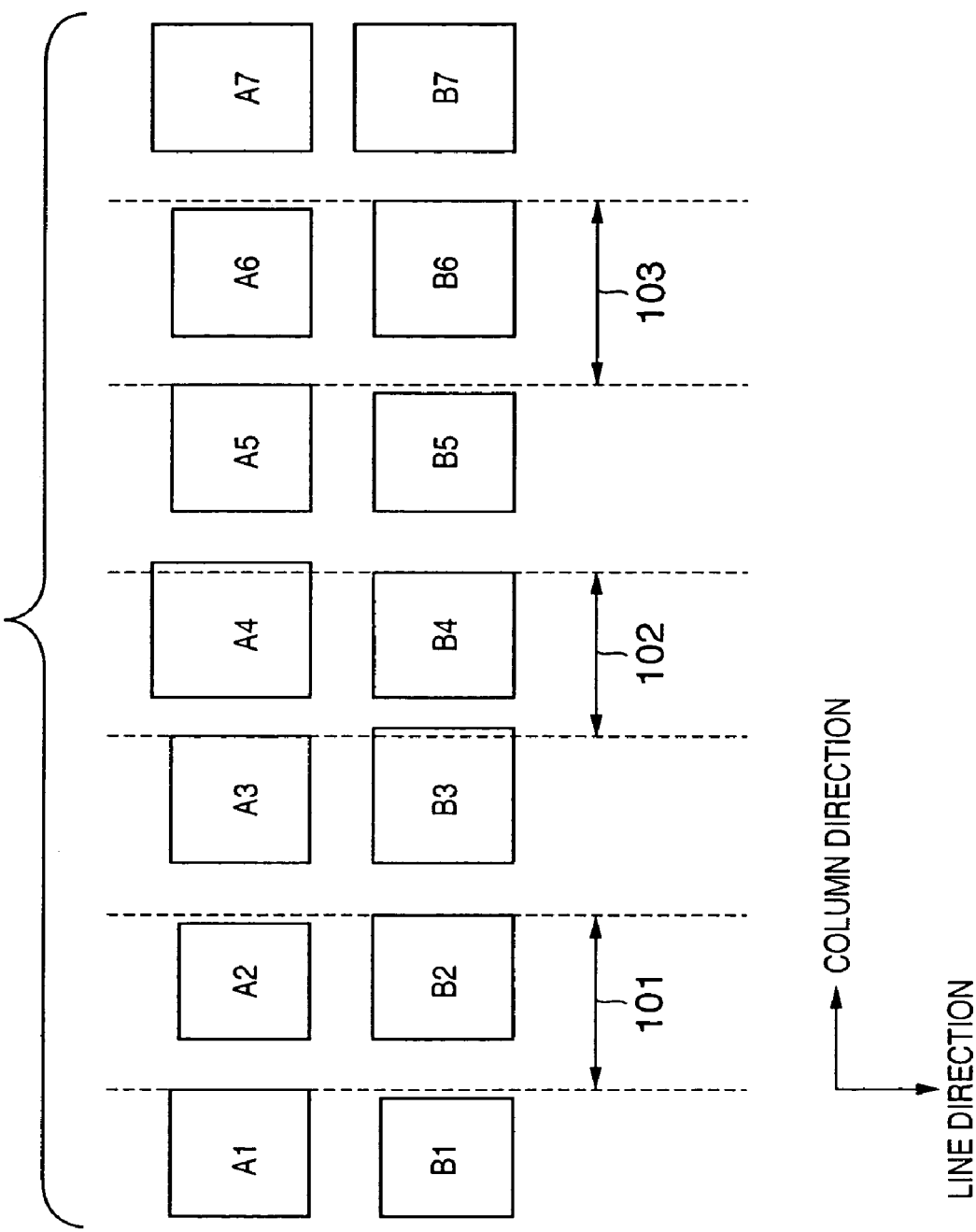
FIG. 1 is a view for explaining the method of embedding a digital watermark data sequence according to the first embodiment of the present invention.

A method of embedding a digital watermark data sequence according to this embodiment will be described below using FIG. 1. FIG. 1 is a view for explaining the method of embedding a digital watermark data sequence according to this embodiment.

Rectangles A1 to A7 and B1 to B7 indicate circumscribing rectangles of characters in a document image. Circumscribing rectangles A1 to A7 are those of characters of the A-th line in the document image. Likewise, circumscribing rectangles B1 to B7 are those of characters of the B-th line in the document image. These circumscribing rectangles are extracted using a document analysis technique.

The circumscribing rectangle of each character is a rectangle that circumscribes a character, and information indicating a region which is to undergo character recognition. As a method of obtaining circumscribing rectangles of characters, the pixel values of a document image are mapped on the vertical coordinate axis to segment the document image into lines by searching for blank portions (portions where no black characters are present), and determining lines (character strings that line up horizontally). After that, the document image is mapped on the horizontal coordinate axis for each line to search for blank portions, thus segmenting the line into characters. In this way, respective characters can be extracted (detected) as circumscribing rectangles. As this method, a method disclosed in, e.g., Japanese Patent Laid-Open No. 6-68301 (U.S. Pat. No. 5,680,479) may be used.

In the following description, an m-th circumscribing rectangle from the leftmost rectangle in FIG. 1, which is located in the n-th line from the uppermost line in FIG. 1, may be expressed as circumscribing rectangle n–m. In FIG. 1, reference numeral 101 denotes a distance between the right edges of circumscribing rectangles A1 and B2; 102, a distance between the right edges of circumscribing rectangles A3 and B4; and 103, a distance between the right edges of circumscribing rectangles A5 and B6. As described above, the method of embedding a digital watermark data sequence according to this embodiment changes these distances in accordance with data to be embedded.

Figure 3:
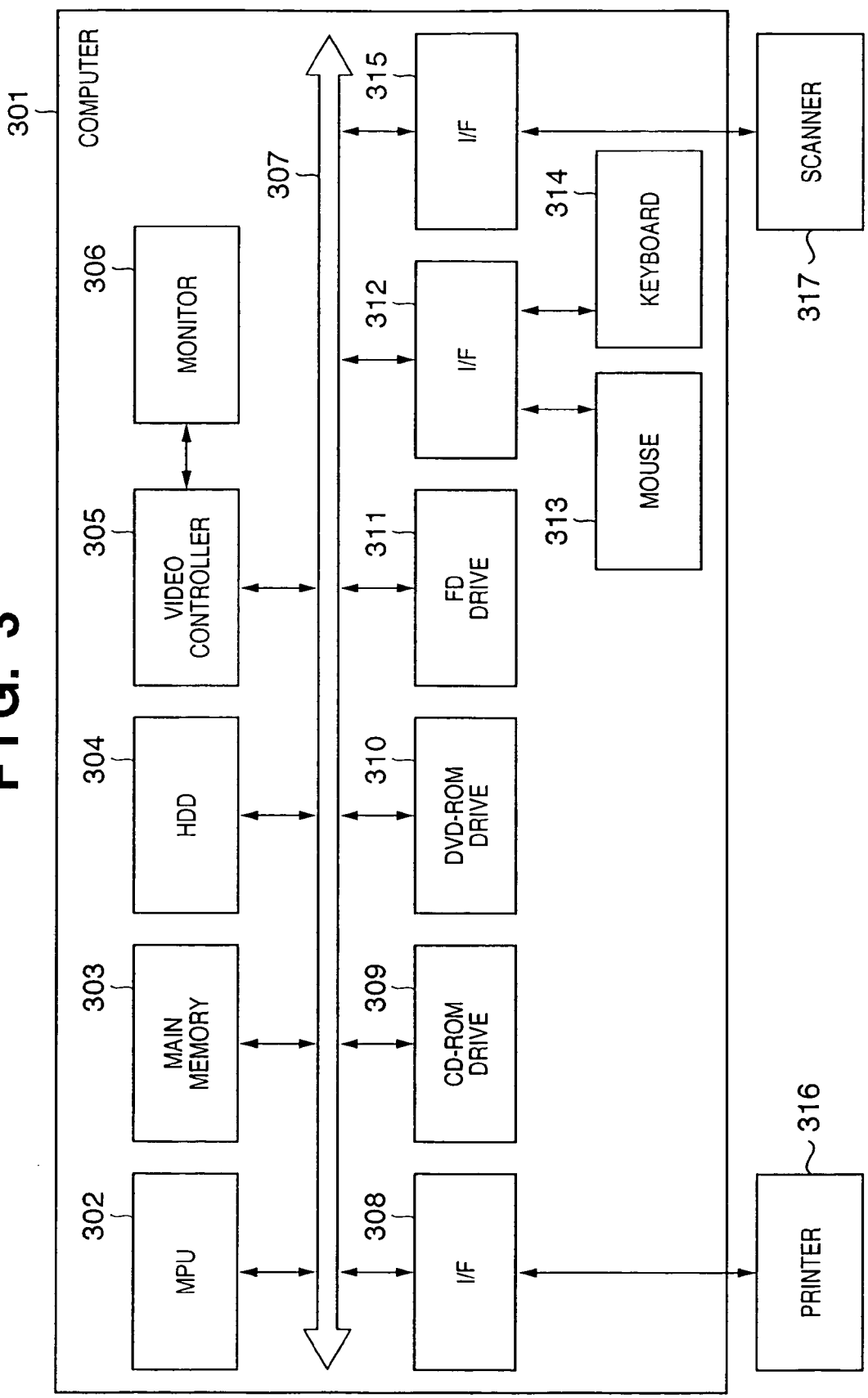
FIG. 3 is a block diagram showing the basic arrangement of a computer which serves as a digital watermark embedding apparatus, and a digital watermark extraction apparatus for extracting a digital watermark data sequence from a document image embedded with the digital watermark data sequence according to the third embodiment of the present invention.

The method of embedding the digital watermark data sequence will be described below. FIG. 3 shows the basic arrangement of a computer which serves as a digital watermark embedding apparatus, and also a digital watermark extraction apparatus for extracting a digital watermark data sequence from a document image embedded with the digital watermark data sequence according to this embodiment. Note that use of all blocks shown in FIG. 3 is not indispensable to implement the embedding method and an extraction method to be described later.

Referring to FIG. 3, a computer 301 is a prevalent personal computer or workstation, and can receive, edit, and save an image scanned by a scanner 317. Also, the computer 301 can print an image scanned by the scanner 317 on a print medium such as a paper sheet, OHP film, or the like using a printer 316. Note that various user's instructions can be input using a mouse 313 and keyboard 314.

In the computer 301, respective blocks to be described below are connected via a bus 307 and can exchange various data. An MPU 302 controls the operations of respective blocks in the computer 301, and executes programs stored in a main memory 303, which comprises a RAM, so as to implement a series of processes associated with embedding of a digital watermark data sequence (to be described later) and a series of processes for extracting a digital watermark data sequence embedded in a document image by this embedding process.

The main memory 303 comprises an area for temporarily storing programs and data loaded from an HDD 304, CD-ROM drive 309, DVD-ROM drive 310, FD drive 311, and the like, and also a work area for temporarily storing data to be processed when the MPU 302 executes various processes.

The hard disk drive (HDD) 304 can pre-store programs and document image data to be loaded onto the main memory 303, and can store processed document image data. An interface (I/F) 315 is connected to the scanner 317, which scans information recorded on a document, film, or the like, and generates image data, and is used to input image data scanned by the scanner 317. An I/F 308 is connected to the printer 316 which prints image data, and transmits image data to be printed to the printer 316.

The CD-ROM drive 309 can read out data stored in a CD-ROM (CD-R/CD-RW) as one of external storage media, and can write data on the CD-R/CD-RW. The FD (floppy®) disk) drive 311 can read out data from an FD and can write data on the FD as in the CD-ROM drive 309. The DVD-ROM drive 310 can read out data from a DVD and can write data on the DVD as in the FD drive 311. When programs or printer drivers are stored in the CD-ROM, FD, DVD-ROM, and the like, these programs are installed on the HDD 304, and are loaded onto the main memory 303 as needed.

An I/F 312 is connected to the mouse 313 and keyboard 314 to receive input instructions from them. A monitor 306 is a display device which can display an extraction process result of a digital watermark data sequence and its progress. Furthermore, a video controller 305 transmits display data to the monitor 306.

The digital watermark data sequence embedding process to be executed by the computer with the above arrangement (by the MPU 302 in practice) will be described below with reference to FIG. 4 which is the flow chart of that process. The progress of the following processes may be displayed on the monitor 306 as needed.

A document image in which a digital watermark is to be embedded is loaded onto the main memory 303 in response to a user's input instruction using the mouse 313 or keyboard 314 (step S400). Assume that this document image is obtained by scanning a print medium such as a paper sheet or the like on which a document is printed, and converting the scan result into bitmap data. However, the method of obtaining a document image is not limited to such specific method. For example, document data created by a general document editor or document data which is loaded from the CD-ROM drive 309, DVD-ROM drive 310, or FD drive 311 onto the main memory 303 may be converted into bitmap data to generate a document image. Also, the apparatus may comprise a network I/F that can connect to a network such as a LAN, Internet, or the like, and may externally receive and obtain a document image via the network. In any of the above cases, a document image is bitmap data.

The document image as bitmap data undergoes the aforementioned document analysis to obtain circumscribing rectangles of characters (step S401). When the user inputs a digital watermark data sequence consisting of 1 or 0 using the keyboard 314 or mouse 313, this data sequence is output to the main memory 303 via the I/F 312, and is stored in the main memory 303 (step S402).

The distance between the right edges of circumscribing rectangles in a pair (first pair) of rectangles n–m and (n+1)–(m+1) is calculated as d1. Taking FIG. 1 as an example, distance d1 corresponds to, e.g., the distance 101 between the right edges of circumscribing rectangles A1 and B2. Also, the distance between the right edges of circumscribing rectangles in a pair (second pair) of rectangles n–(m+2) and (n+1)–(m+3) is calculated as d2. Taking FIG. 1 as an example, distance d2 corresponds to, e.g., the distance 102 between the right edges of circumscribing rectangles A3 and B4. That is, these distances d1 and d2 are calculated in step S403.

If data to be embedded is 1, the flow advances to step S405 to execute one or a combination of the following two change processes so as to satisfy d1>d2 (step S405).

The size of circumscribing rectangle B2 in the column direction is increased or the size of circumscribing rectangle B4 in the column direction is decreased (a change in size).

The position of circumscribing rectangle B2 is moved toward the circumscribing rectangle B3 side or the position of circumscribing rectangle B4 is moved toward the circumscribing rectangle B3 side (a change in position).

An instruction for one or a combination of these two change processes to be executed may be determined in advance or may be input by the user.

On the other hand, if data to be embedded is 0, the flow advances to step S406 to execute one or a combination of the following two change processes so as to satisfy d1<d2 (step S406).

The size of circumscribing rectangle B2 in the column direction is decreased or the size of circumscribing rectangle B4 in the column direction is increased (a change in size).

The position of circumscribing rectangle B2 is moved toward the circumscribing rectangle B1 side or the position of circumscribing rectangle B4 is moved toward the circumscribing rectangle B5 side (a change in position).

An instruction for one or a combination of these two parameter change processes to be executed may be determined in advance or may be input by the user. Also, upon execution of the control process that changes the position and/or size of the circumscribing rectangle, the position and/or size of a character circumscribed by the circumscribing rectangle are/is similarly changed accordingly.

Circumscribing rectangles to be changed in the above position change process and/or size change process are not limited to those described above, and one of d1>d2 and d1<d2 need only be met in correspondence with information to be embedded.

The change process in step S405 or S406 is executed to obscure the change portion, i.e., to minimize deterioration of the image quality.

Referring back to FIG. 4, if data to be embedded still remains, the flow returns to step S403 to repeat the above processes. For example, if data to be embedded still remains, the distance between the right edges of circumscribing rectangles in a pair (first pair) of circumscribing rectangles n–(m+4) and (n+1)–(m+5) is calculated as d1, and the distance between the right edges of circumscribing rectangles in a pair (second pair) of circumscribing rectangles n–(m+6) and (n+1)–(m+7) is calculated as d2, in step S403. Then, the processes in step S404 and subsequent steps are repeated.

Figure 5:
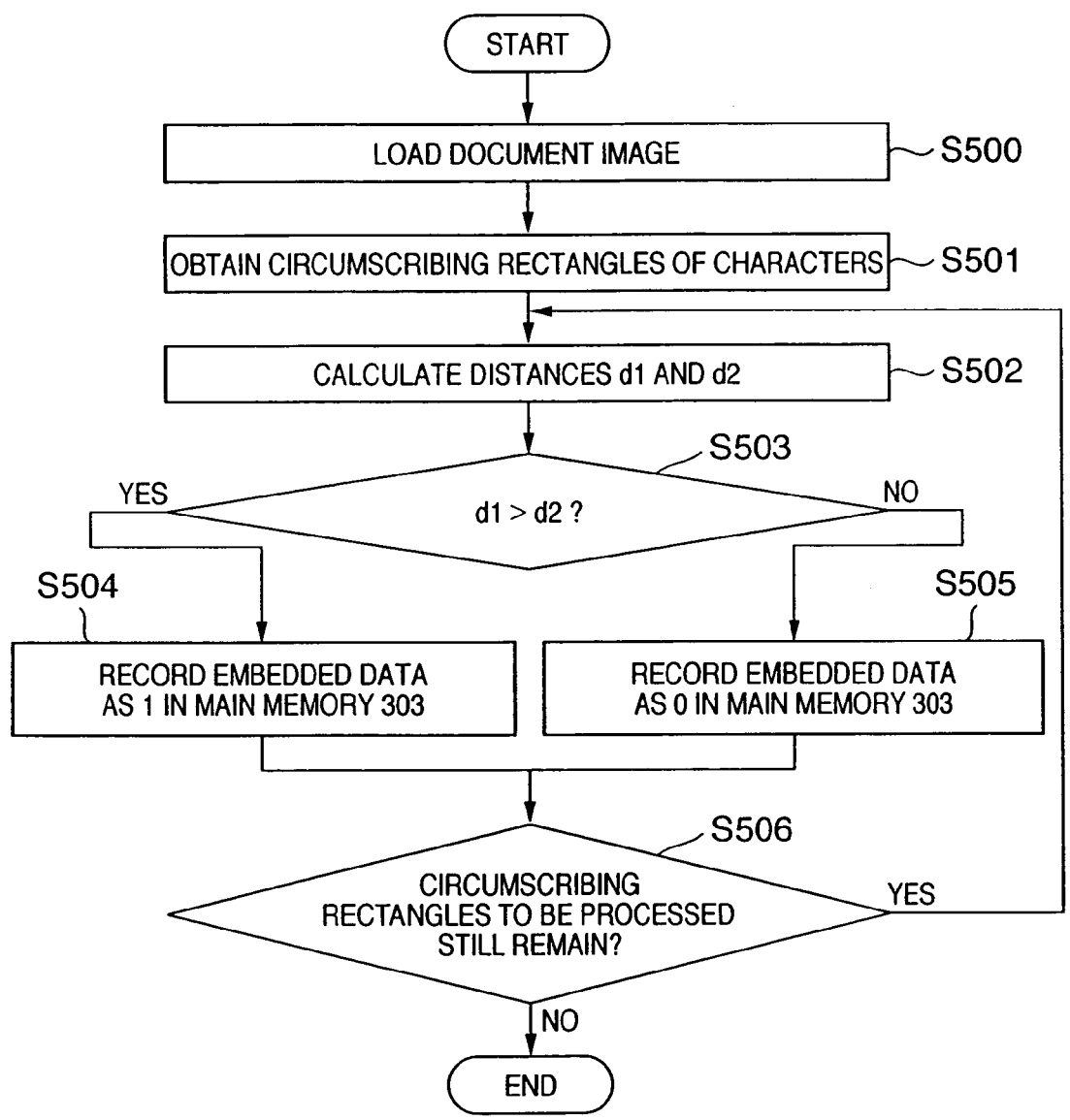
FIG. 5 is a flow chart of the process for extracting a digital watermark data sequence according to the first embodiment of the present invention.

A method of extracting a digital watermark data sequence embedded by the aforementioned process will be described below. As described above, the process for extracting a digital watermark data sequence is also executed by the computer shown in FIG. 3. FIG. 5 is a flow chart showing the process to be executed by the computer (the MPU 302 in practice) to extract a digital watermark data sequence embedded by the aforementioned process.

A document image embedded with a digital watermark data sequence (to be referred to as a watermarked image hereinafter) is loaded onto the main memory 303 in response to a user's input instruction using the mouse 313 or keyboard 314 (step S500). Assume that this watermarked image is obtained by scanning, using the scanner 317, a print medium such as a paper sheet, OHP film, or the like on which a watermarked image generated by the above embedding process is printed by the printer 317, and converting the scan result into bitmap data. However, the method of obtaining a watermarked image is not limited to such specific method. For example, the watermarked image may be loaded from the HDD 304, CD-ROM drive 309, DVD-ROM drive 310, or FD drive 311 onto the main memory 303. Also, the apparatus may comprise a network I/F that can connect to a network such as a LAN, Internet, or the like, and may externally receive and obtain the watermarked image via the network.

The watermarked image undergoes the aforementioned document analysis to obtain circumscribing rectangles of characters (step S501). The process in this step is the same as the processing contents of step S401.

Next, distance d1 between circumscribing rectangles n–m and (n+1)–(m+1) and distance d2 between circumscribing rectangles n–(m+2) and (n+1)–(m+3) are calculated (step S502). If d1>d2 (step S503), the flow advances to step S504 to record embedded data as 1 in the main memory 303 (step S504). On the other hand, if d1<d2, the flow advances to step S505 to record embedded data as 0 in the main memory 303 (step S505).

It is then checked if circumscribing rectangles to be processed still remain (step S506). For example, if circumscribing rectangles to be processed still remain, distance d1 between circumscribing rectangles n–(m+4) and (n+1)–(m+5) and distance d2 between circumscribing rectangles n–(m+6) and (n+1)–(m+7) are calculated in step S502 to repeat the processes in step S503 and subsequent steps. If the number of embedded digital watermark data is known in advance, it may be determined whether or not those data have been recorded on the main memory 303.

If it is determined in step S506 that no circumscribing rectangle to be processed remains, the data sequence recorded in the main memory 303 in steps S504 and S505 can be obtained as a digital watermark data sequence. With the above process, the data sequence can be extracted from a document image in which the digital watermark data sequence is embedded by the aforementioned method.

In the aforementioned embedding method of a digital watermark into a document image, since the distance between circumscribing rectangles in different lines is changed in place of that between circumscribing rectangles in a single line, a portion to be changed can be distributed over the entire document image in place of changing the distance between circumscribing rectangles in a single line. Hence, a change in document image is hardly recognized by the human eye, and the image quality of the document image in which the digital watermark is embedded can be suppressed consequently.

In this embodiment, when two circumscribing rectangles form one pair, the line positions and the positions of the circumscribing rectangles from the leftmost rectangles in these lines are each different by one. However, the line positions of circumscribing rectangles may be spaced by two or more lines, and the positions of the circumscribing rectangles from the leftmost rectangles in these lines may be spaced by two or more rectangles. Also, respective pairs may have different positional relationships between circumscribing rectangles which belong to them.

Figure 2:
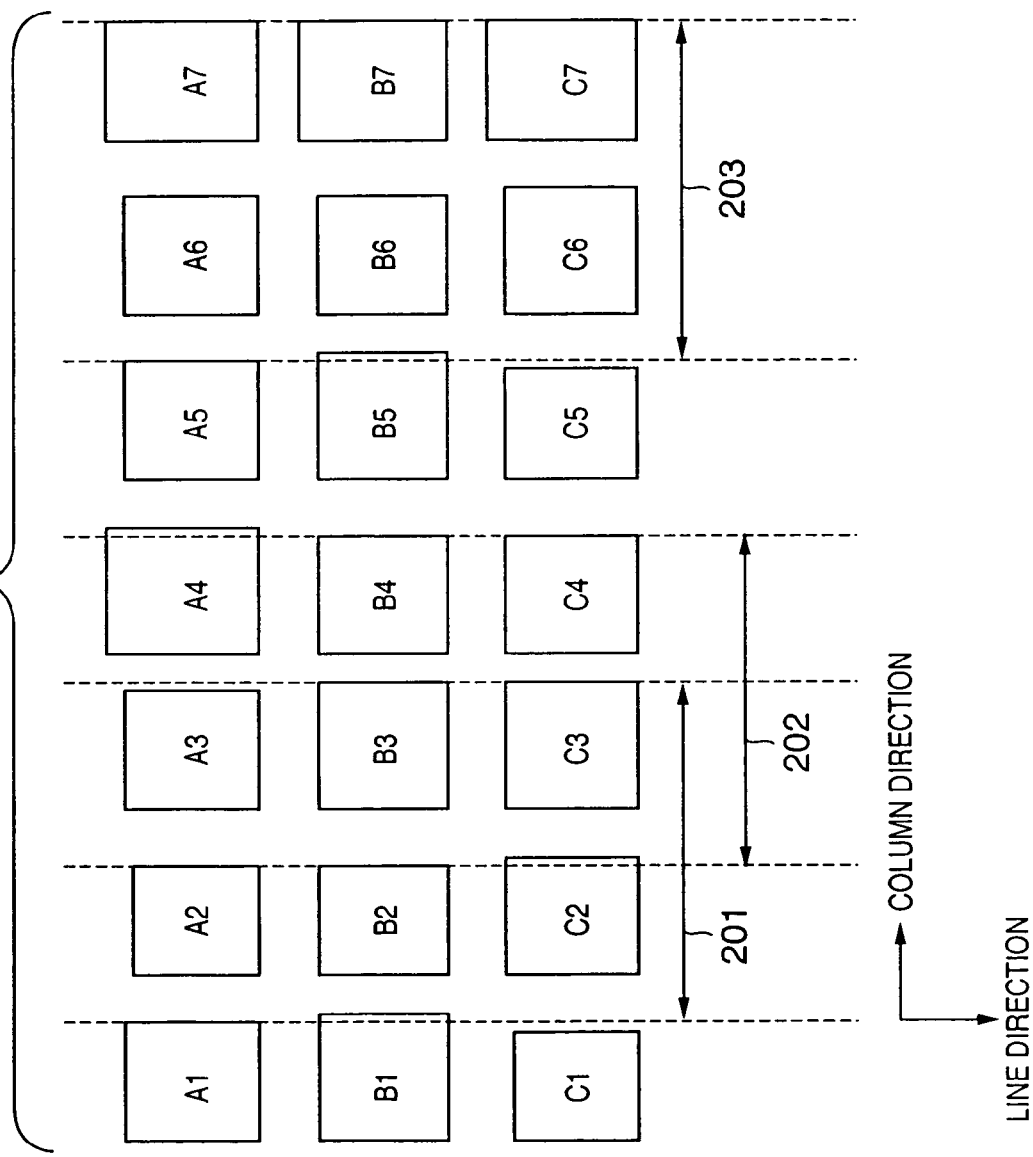
FIG. 2 is a view showing an example of formation of pairs.

FIG. 2 shows an example of formation of pairs. In FIG. 2, A1 and C3, A2 and C4, and A5 and C7 form pairs. Also, distances between circumscribing rectangles may be selected by different methods in respective pairs. For example, the distance between the right edge of one circumscribing rectangle and the left edge of the other circumscribing rectangle may be used, or either the distance between the right edges of the two circumscribing rectangles or the distance between the left edges of the two circumscribing rectangles may be used. When the method of selecting the distance is changed (e.g., for respective pairs) in this manner, the embedding method can become complex, and the secrecy of information to be embedded can be improved. Furthermore, combinations of lines may be complicated by selecting d1 from the distances between circumscribing rectangles in lines A and C, and selecting d2 from those in lines A and B.

However, when a digital watermark data sequence embedded by the above process is extracted, information indicating the positional relationship between circumscribing rectangles that belong to each pair, and information indicating the method of selecting the distance are required for each pair (this embodiment requires only one each information since all pairs have the same positional relationship between circumscribing rectangle and the same method of selecting the distance).

Also, circumscribing rectangles between which distances d1 and d2 are to be calculated may be selected using a pseudo random number in accordance with digital watermark data to be embedded. Taking FIG. 1 as an example, when a pseudo random number is "0", the distance 101 is selected as d1, and the distance 102 is selected as d2; when a pseudo random number is "1", the distance 101 is selected as d1, and the distance 103 is selected as d2; and so forth.

Second Embodiment

In the first embodiment, two pairs of circumscribing rectangles, i.e., four circumscribing rectangles are required to embed 1-bit digital watermark data. This embodiment has as its object to reduce the number of circumscribing rectangles used to embed 1-bit digital watermark data, and to embed more digital watermark data than the digital watermark embedding method according to the first embodiment using a limited number of circumscribing rectangles. Note that the digital watermark embedding method according to this embodiment is executed by the MPU 302 in the apparatus with the arrangement shown in FIG. 3 as in the first embodiment. In addition, the same techniques as those in the first embodiment are basically used unless otherwise specified.

Figure 6:
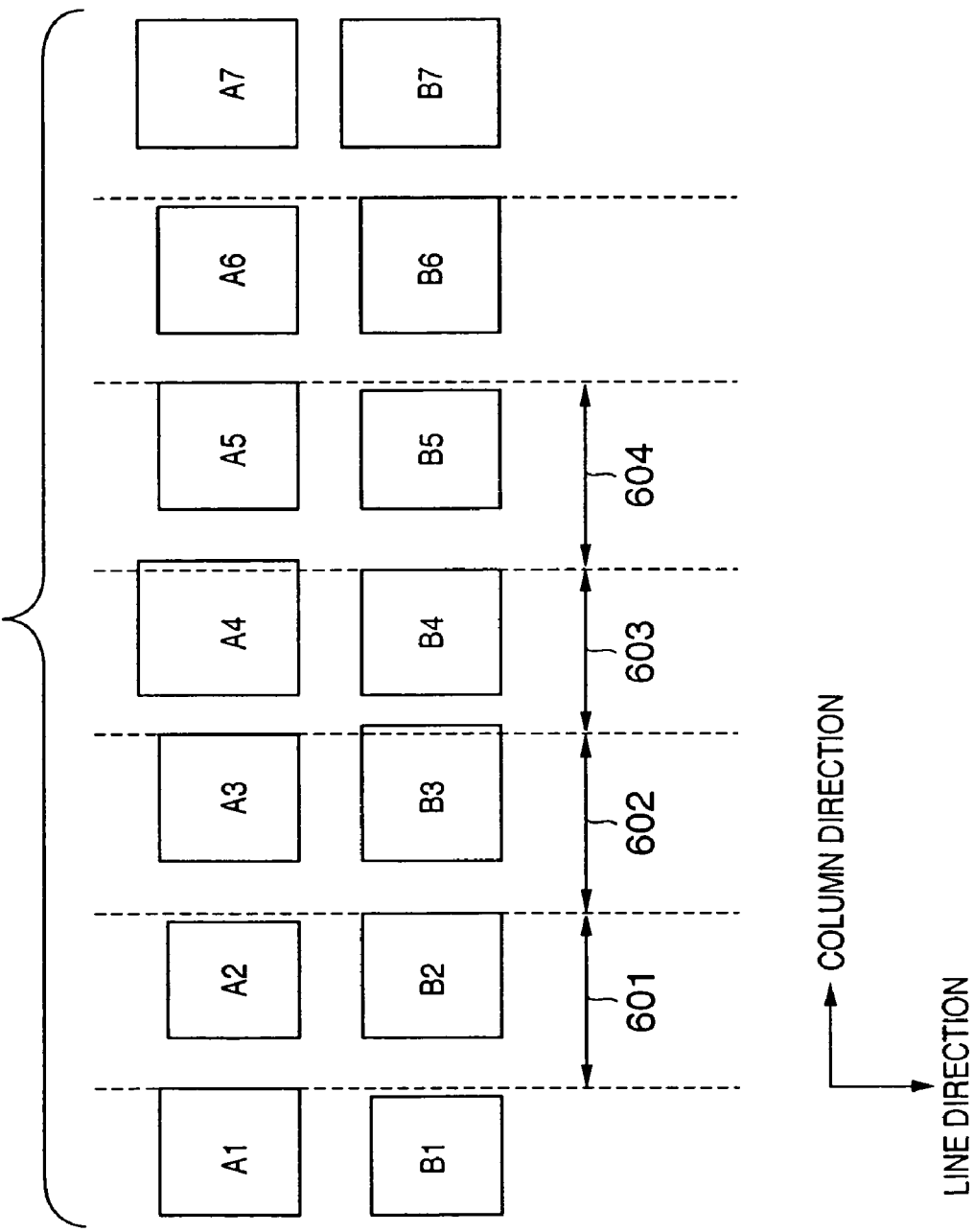
FIG. 6 is a view for explaining a digital watermark embedding method according to the second embodiment of the present invention.

FIG. 6 is a view for explaining the digital watermark embedding method according to this embodiment. Referring to FIG. 6, rectangles A1 to A7 indicate circumscribing rectangles which are arranged in a single line as in FIG. 1, and rectangles B1 to B7 also indicate circumscribing rectangles which are arranged in a single line as in FIG. 1. Reference numeral 601 denotes a distance between the right edges of A1 and B2; 602, a distance between the right edges of B2 and A3; 603, a distance between the right edges of A3 and B4; and 604, a distance between the right edges of A4 and B5.

Figure 4:
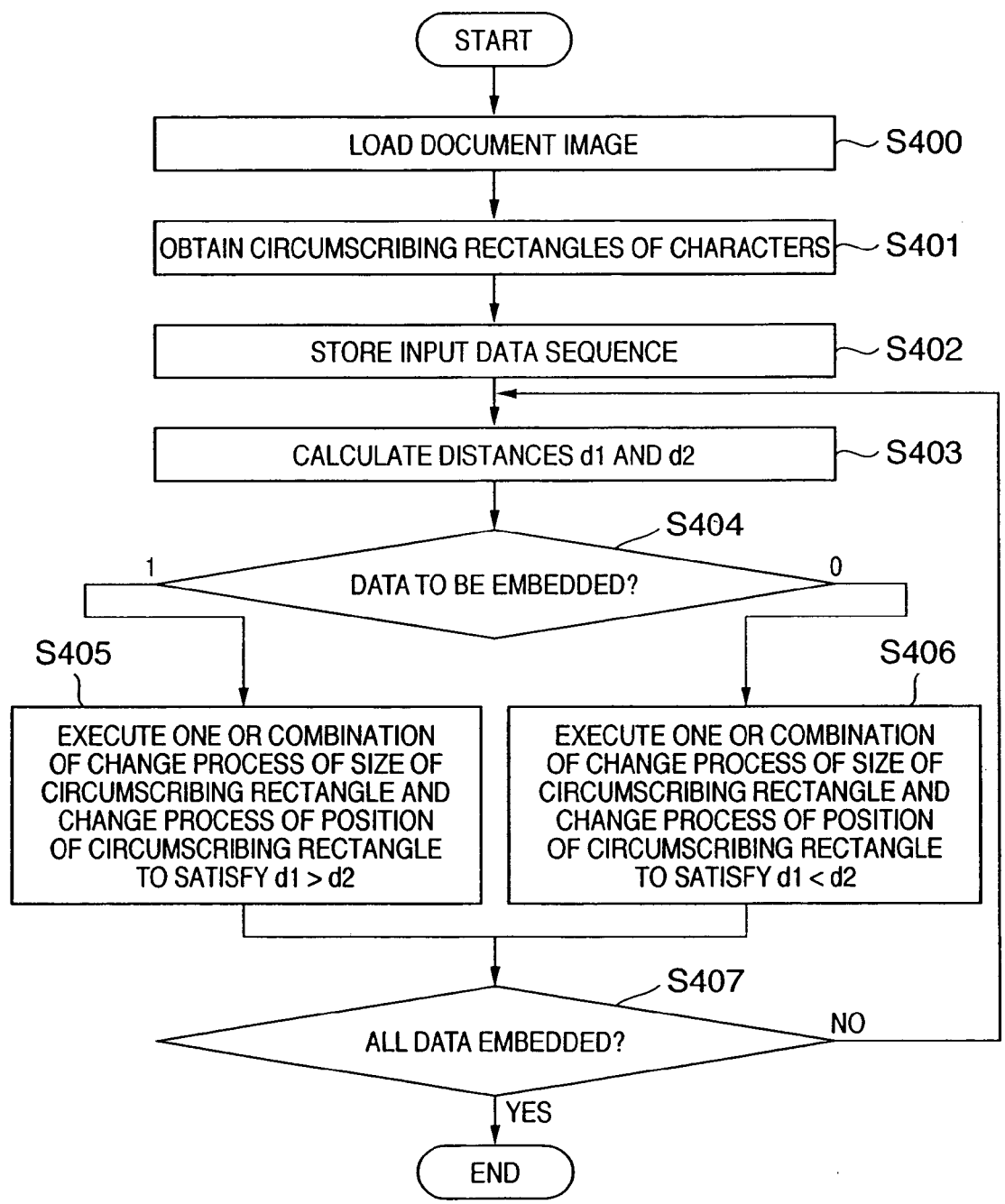
FIG. 4 is a flow chart of the process for embedding a digital watermark data sequence according to the first embodiment of the present invention.

The flow chart of the digital watermark embedding process according to this embodiment basically follows the flow shown in FIG. 4. Taking the circumscribing rectangles shown in FIG. 6 as an example, d1 and d2 to be calculated in step S403 are respectively the distances 601 and 602. If data to be embedded is 1, one or a combination of the following two change processes is executed in step S405 to meet d1>d2.

The size of circumscribing rectangle A1 in the column direction is decreased or the size of circumscribing rectangle A3 in the column direction is decreased (a change in size).
  The position of circumscribing rectangle B2 is moved toward the circumscribing rectangle B3 side or the position of circumscribing rectangle A3 is moved toward the circumscribing rectangle A2 side (a change in position).

On the other hand, if data to be embedded is 0, one or a combination of the following two change processes is executed in step S406 to meet d1<d2.

The size of circumscribing rectangle A1 in the column direction is increased or the size of circumscribing rectangle A3 in the column direction is increased (a change in size).
  The position of circumscribing rectangle B2 is moved toward the circumscribing rectangle B1 side or the position of circumscribing rectangle A3 is moved toward the circumscribing rectangle A4 side (a change in position).

An instruction for one or a combination of these two change processes to be executed may be determined in advance or may be input by the user. Also, upon execution of the control process that changes the position and/or size of the circumscribing rectangle, the position and/or size of a character circumscribed by the circumscribing rectangle are/is similarly changed accordingly.

Circumscribing rectangles to be changed in the above position change process and/or size change process are not limited to those described above, and one of d1>d2 and d1<d2 need only be met in correspondence with information to be embedded. In the above process, distance d2 is preferably changed without changing distance d1.

If it is determined in step S407 that data to be embedded still remains, the flow returns to step S403 to repeat the aforementioned process by selecting the distance 602 as d1 and the distance 603 as d2. In this case, the distance 603 is changed without changing the aforementioned relationship between the distances 601 and 602.

As described above, in the digital watermark embedding method according to this embodiment, the number of circumscribing rectangles required to embed 1-bit data is three upon embedding the first 1 bit, and only one new circumscribing rectangle is used to embed each of subsequent bits. Except for the first 1 bit, 1-bit data can be embedded using one circumscribing rectangle. Hence, when digital watermark data is embedded using a limited number of circumscribing rectangles, the digital watermark embedding method according to this embodiment can embed more data than the first embodiment.

The method of extracting digital watermark data from a document image in which digital watermark data is embedded according to the aforementioned digital watermark embedding method is basically the same as the first embodiment except for the method of selecting distances d1 and d2 (the method of selecting d1 and d2 in the aforementioned digital watermark embedding process). That is, the process according to the flow chart shown in FIG. 5 is executed. Also, the process for extracting a digital watermark data sequence is executed by the computer (MPU 302) shown in FIG. 3.

Figure 7:
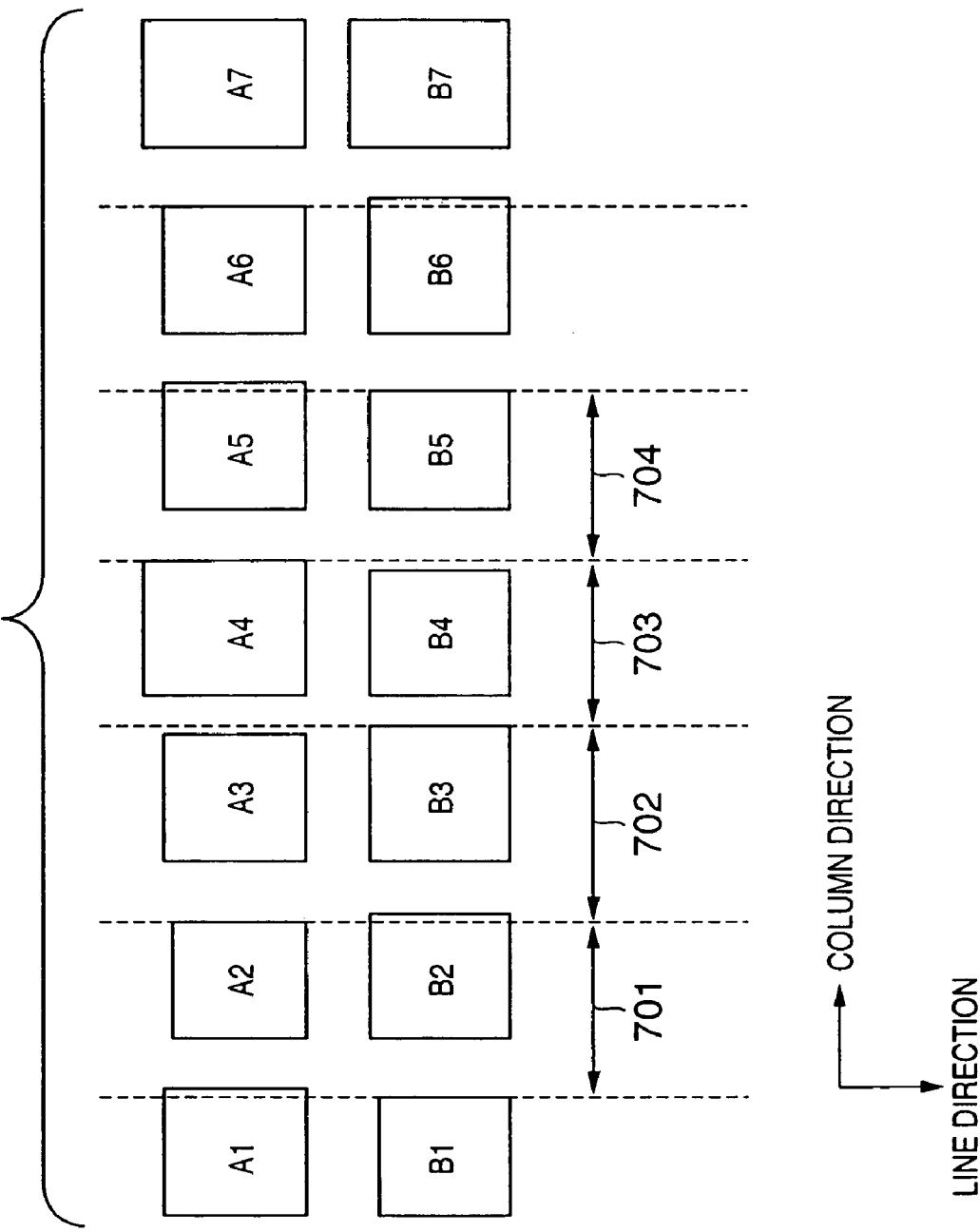
FIG. 7 is a view for explaining a method of embedding more digital watermark data using circumscribing rectangles, which are not used in the digital watermark embedding method according to the second embodiment of the present invention.

Also, when circumscribing rectangles which are not used in the digital watermark embedding method according to this embodiment are further used, more digital watermark data can be embedded. FIG. 7 is a view for explaining this method. Rectangles A1 to A7 and B1 to B7 are the same as those shown in FIG. 6. In this embodiment, circumscribing rectangles B1, A2, B3, A4, B5, and A6 are not used to embed digital watermark data. Hence, since the process of this embodiment is executed by selecting a distance 701 between the right edges of B1 and A2 as d1, and a distance 702 between the right edges of A2 and B3 as d2, as shown in FIG. 7, digital watermark data can be embedded using circumscribing rectangles which are not used in the digital watermark embedding method according to this embodiment, and more data can be embedded.

Third Embodiment

The digital watermark embedding method according to the second embodiment has a merit that it can embed more data than that of the first embodiment. However, since the changed positions (those to which distances d1 and d2 are applied) are denser than the first embodiment, the image quality of a document image after embedding is more likely to deteriorate.

To solve this problem, the digital watermark embedding method according to this embodiment embeds all data to be embedded using three circumscribing rectangles, but sets each consisting of three circumscribing rectangles are separated from each other. The digital watermark embedding method according to this embodiment will be described below using FIG. 8. Note that the digital watermark embedding method according to this embodiment is executed by the MPU 302 in the apparatus with the arrangement shown in FIG. 3 as in the first embodiment. In addition, the same techniques as those in the first embodiment are basically used unless otherwise specified.

Figure 8:
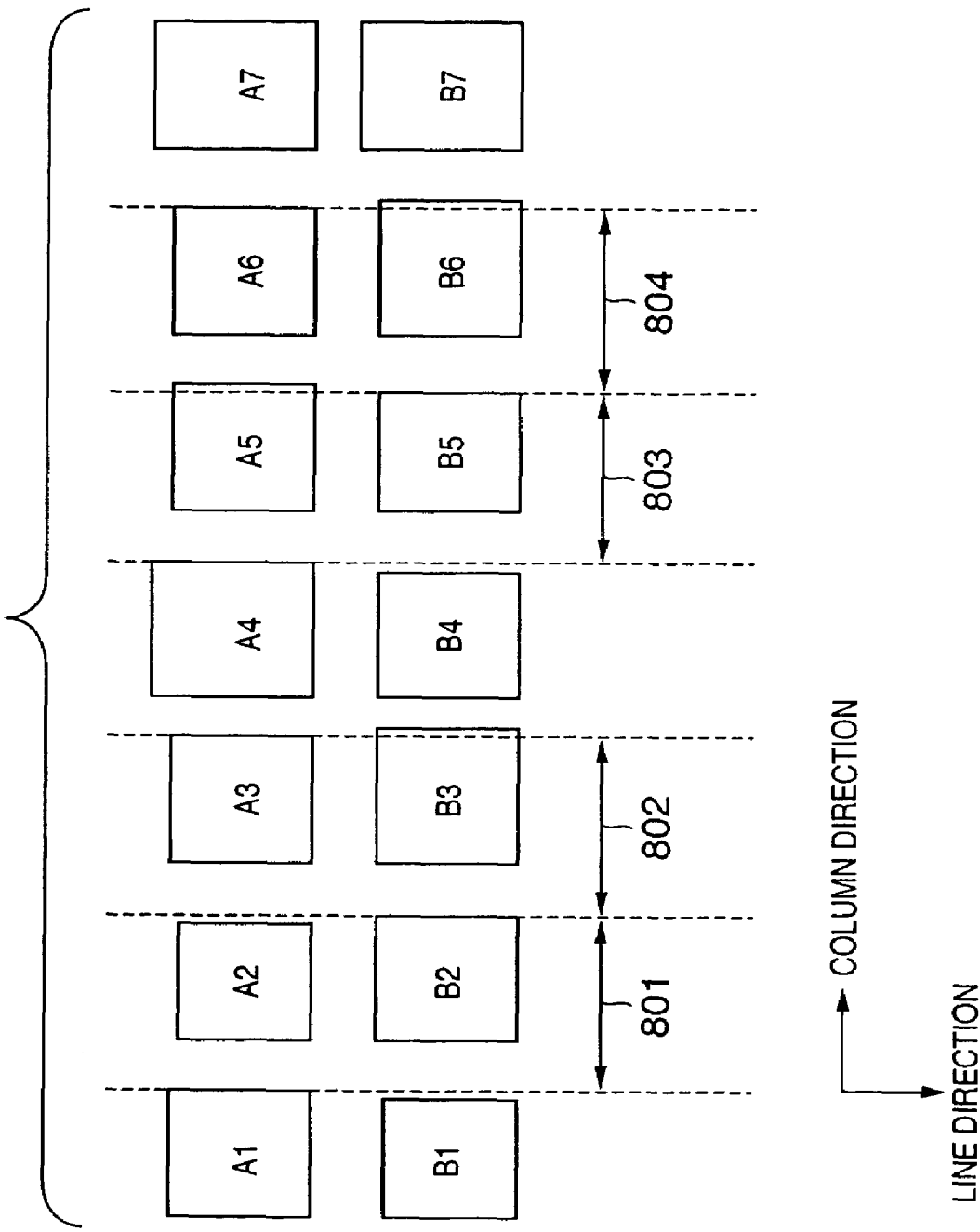
FIG. 8 is a view for explaining a digital watermark embedding method according to the third embodiment of the present invention.

FIG. 8 is a view for explaining the digital watermark embedding method according to this embodiment. Referring to FIG. 8, rectangles A1 to A7 indicate circumscribing rectangles which are arranged in a single line as in FIG. 6, and rectangles B1 to B7 also indicate circumscribing rectangles which are arranged in a single line as in FIG. 6. Reference numeral 801 denotes a distance between the right edges of A1 and B2; 802, a distance between the right edges of B2 and A3; 803, a distance between the right edges of A4 and B5; and 804, a distance between the right edges of A5 and B6. The digital watermark embedding method according to this embodiment embeds each bit of digital watermark data using three circumscribing rectangles by the same method as that upon embedding the first 1 bit in the second embodiment, but the method of selecting three circumscribing rectangles is different from the second embodiment. That is, as shown in FIG. 8, sets each consisting three circumscribing rectangles (a set of A1, B2, A3 and a set of A4, B5, and A6 in FIG. 8) are separated by one circumscribing rectangle.

Then, digital watermark data is embedded by applying the same method as that upon embedding the first 1 bit in the second embodiment to the respective sets. At this time, circumscribing rectangles A1 and A4 are not changed. In this way, since the changed portions are distributed, deterioration of the image quality of a document image after digital watermark data is embedded can be suppressed.

The method of extracting digital watermark data from a document image in which digital watermark data is embedded according to the aforementioned digital watermark embedding method is basically the same as the first embodiment except for the method of selecting distances d1 and d2 (the method of selecting d1 and d2 in the aforementioned digital watermark embedding process). That is, the process according to the flow chart shown in FIG. 5 is executed. Also, the process for extracting a digital watermark data sequence is executed by the computer (MPU 302) shown in FIG. 3.

Figure 9:
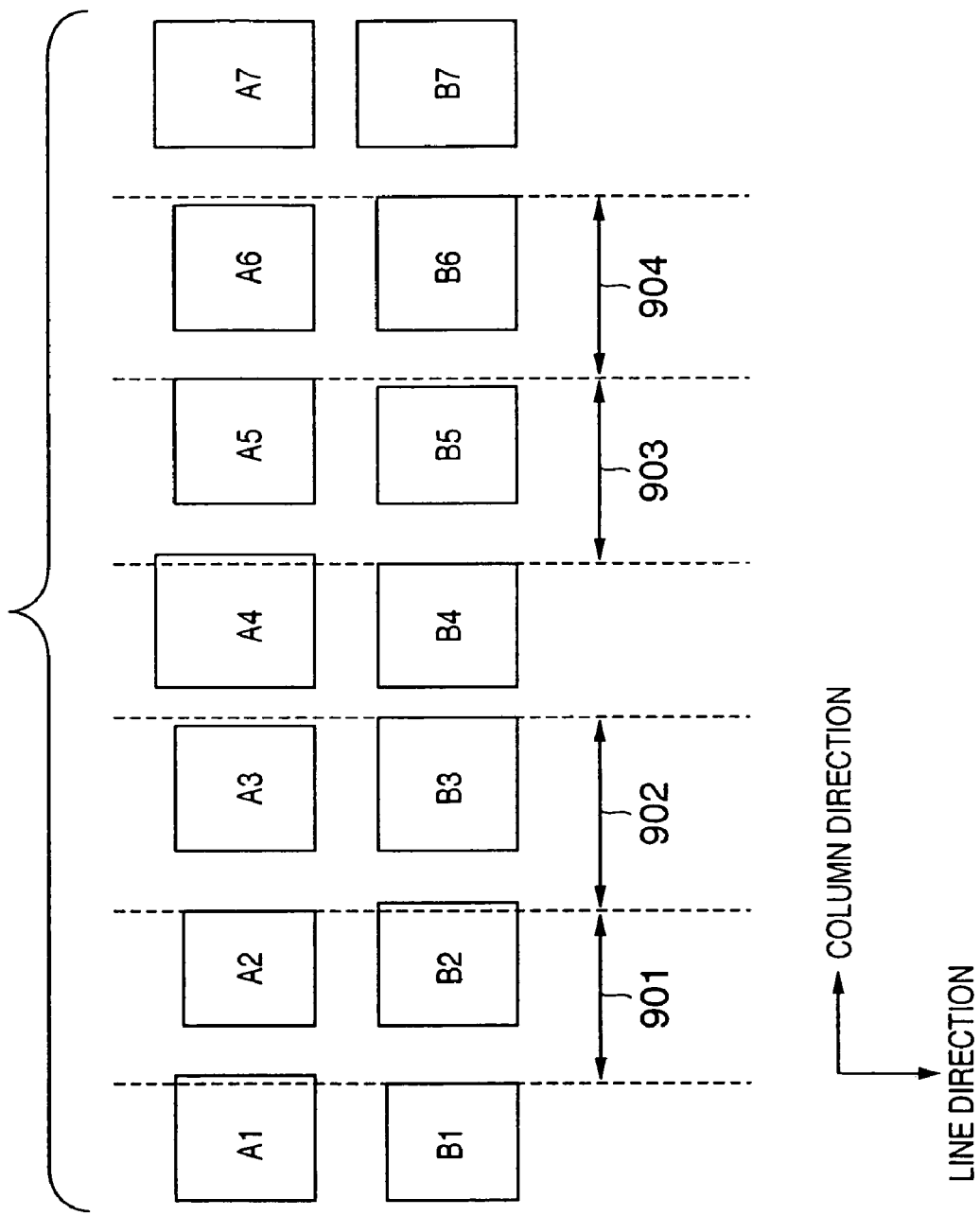
FIG. 9 is a view for explaining a method of embedding more digital watermark data using circumscribing rectangles, which are not used in the digital watermark embedding method according to the third embodiment of the present invention.

Also, when circumscribing rectangles which are not used in the digital watermark embedding method according to this embodiment are further used, more digital watermark data can be embedded. FIG. 9 is a view for explaining this method. Rectangles A1 to A7 and B1 to B7 are the same as those shown in FIG. 8. In this embodiment, circumscribing rectangles B1, A2, B3, A4, B5, and A6 are not used to embed digital watermark data. Hence, since the process of this embodiment is executed by selecting a distance 901 between the right edges of B1 and A2 as d1, and a distance 902 between the right edges of A2 and B3 as d2, as shown in FIG. 9, digital watermark data can be embedded using circumscribing rectangles which are not used in the digital watermark embedding method according to this embodiment, and more data can be embedded.

Note that the respective sets are spaced by one circumscribing rectangle in this embodiment. However, the present invention is not limited to such specific space, and that space may be changed in consideration of the number of circumscribing rectangles in the line direction of those included in a document image.

Fourth Embodiment

Figure 10:
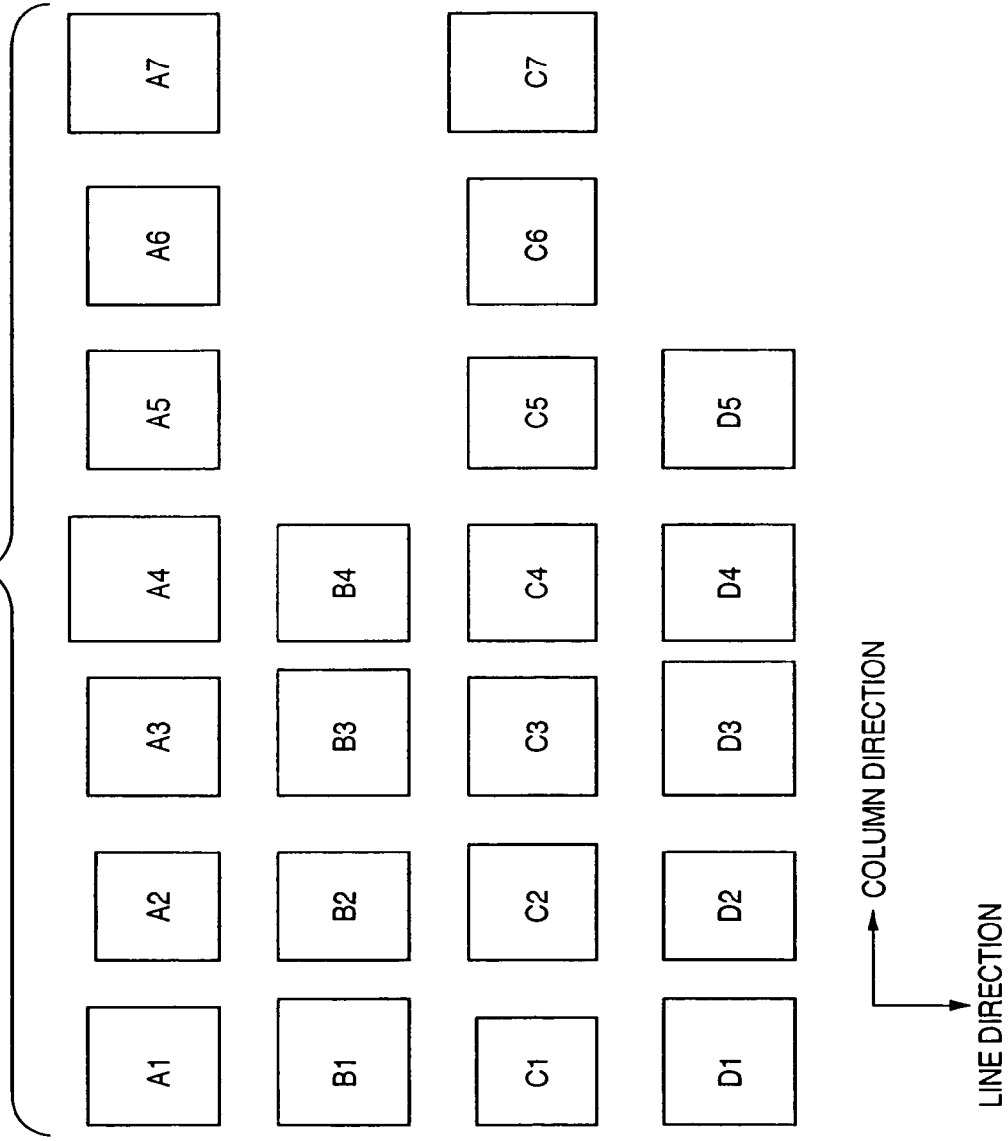
FIG. 10 is a view for explaining a case wherein lines include different numbers of characters, i.e., circumscribing rectangles.

The first to third embodiments described above are implemented by comparing the distances between circumscribing rectangles in different lines. However, this method is not efficient when respective lines have different numbers of characters, i.e., circumscribing rectangles, as shown in FIG. 10. For example, upon embedding a digital watermark by combining the first and second lines, rectangles A5 to A7, C6, and C7 cannot be used and wasted since they have no characters to be combined. Hence, the digital watermark embedding method according to this embodiment embeds a digital watermark while minimizing wasted circumscribing rectangles even when respective lines have different numbers of circumscribing rectangles, as exemplified in FIG. 10.

Note that the digital watermark embedding method according to this embodiment is executed by the MPU 302 in the apparatus with the arrangement shown in FIG. 3 as in the first embodiment. In addition, the same techniques as those in the first embodiment are basically used unless otherwise specified.

Figure 11:
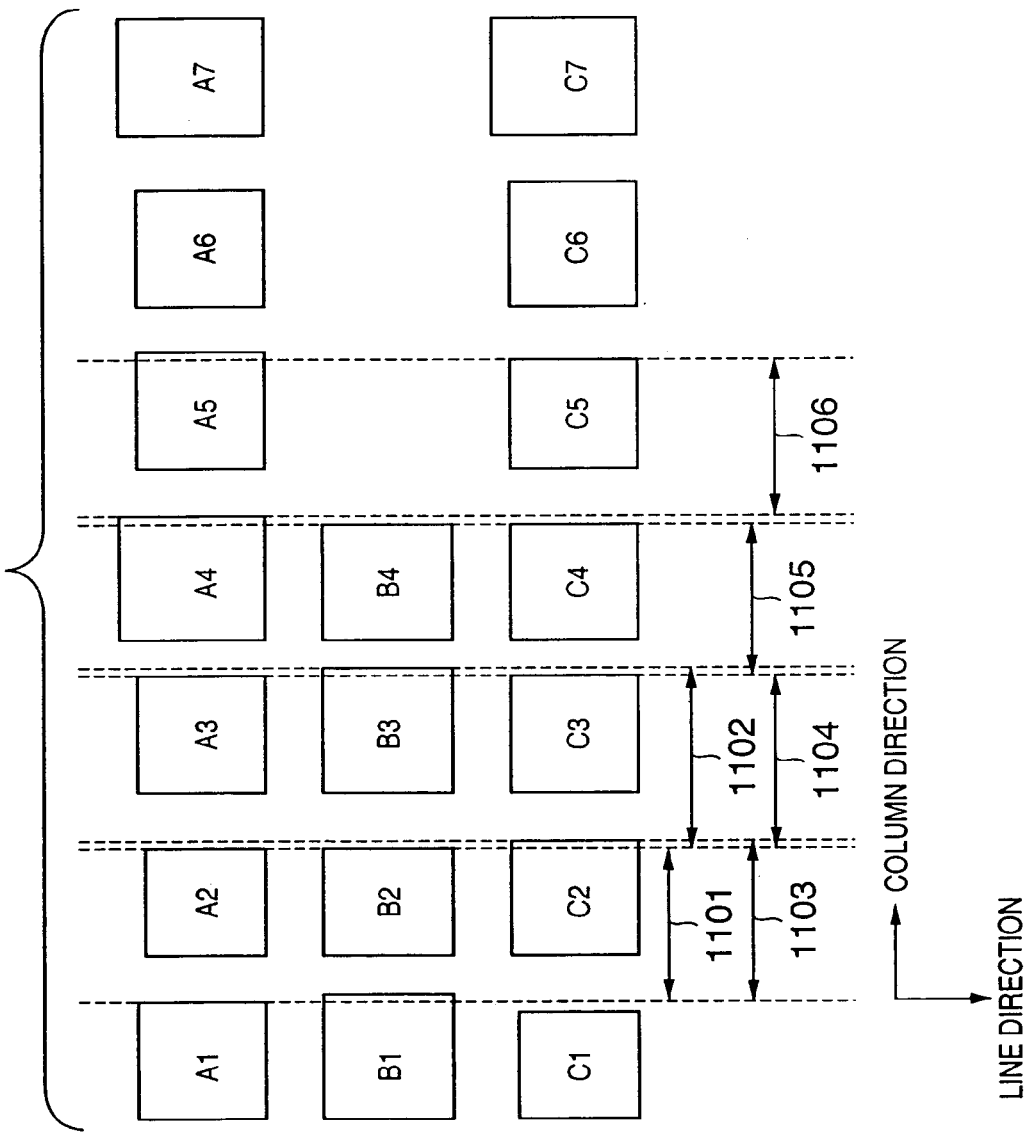
FIG. 11 is a view for explaining a digital watermark embedding method according to the fourth embodiment of the present invention.

FIG. 11 is a view for explaining the digital watermark embedding method according to this embodiment. Circumscribing rectangles A1 to A7, B1 to B4, and C1 to C7 shown in FIG. 11 are the same as those shown in FIG. 10. Referring to FIG. 11, reference numeral 1101 denotes a distance between the right edges of A1 and B2; 1102, a distance between the right edges of A2 and B3; 1103, a distance between the right edges of A1 and C2; 1104, a distance between the right edges of A2 and C3; 1105, a distance between the right edges of A3 and C4; and 1106, a distance between the right edges of A4 and C5. The digital watermark embedding method according to this embodiment will be described below taken FIG. 11 as an example.

Figure 13:
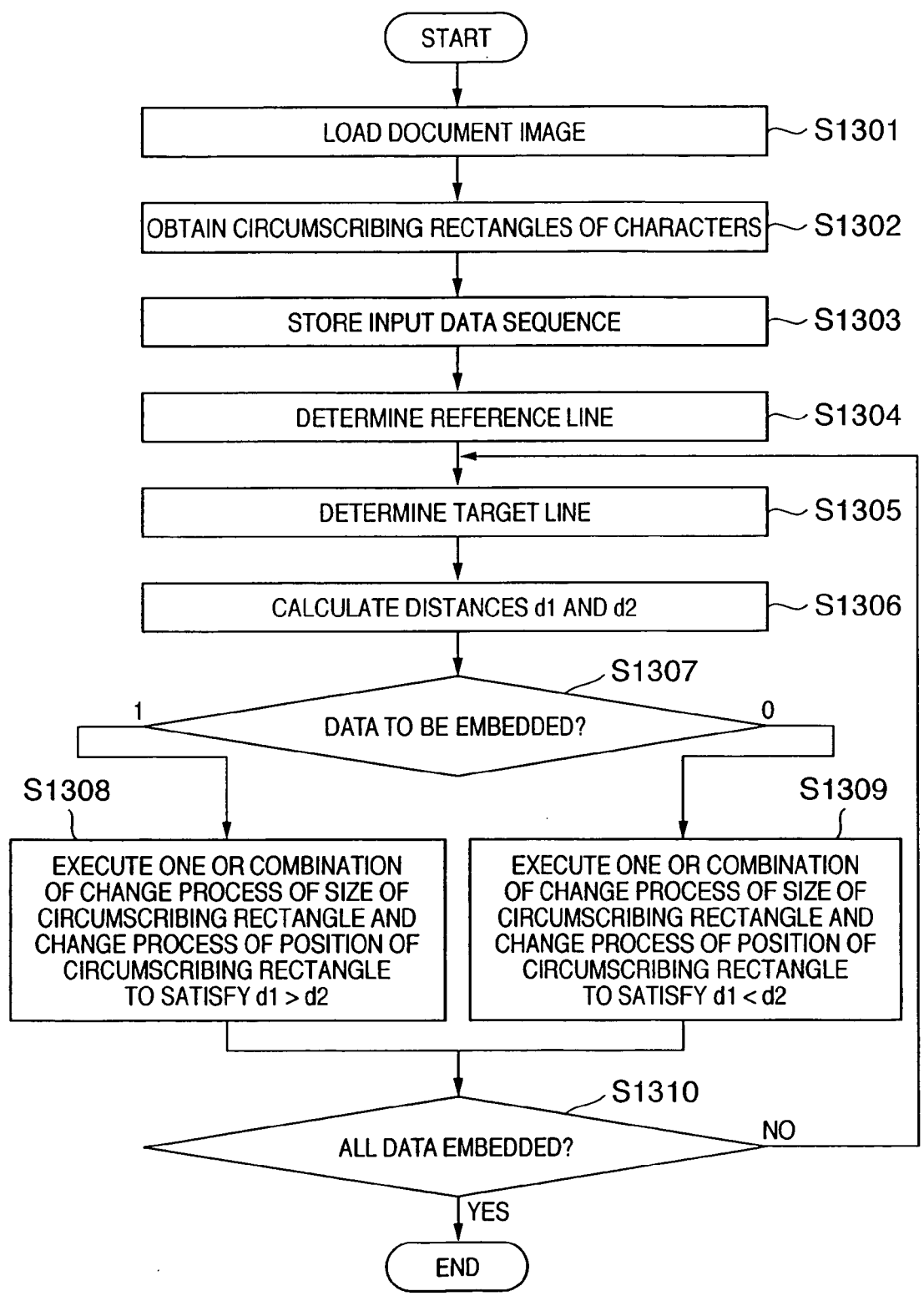
FIG. 13 is a flow chart of the digital watermark embedding process according to the fourth embodiment of the present invention.

The flow chart of the digital watermark embedding process according to this embodiment basically follows the flow shown in FIG. 4, but which distances are to be calculated as d1 and d2 in step S403 is different from the above embodiment. FIG. 13 is a flow chart of the digital watermark embedding process according to this embodiment.

Since the processes in steps S1301 to S1303 are the same as those in steps S400 to S402, a description thereof will be omitted. In step S1304, a reference line is determined. Since this reference line is a line having the largest length, i.e., a line including the largest number of circumscribing rectangles, the first line (a line including circumscribing rectangles A1 to A7) is selected in this case. More specifically, circumscribing rectangles obtained in step S1302 are counted for respective lines, and a line with the largest count value is selected as the reference line. When a plurality of lines have the largest count value, a line closest to the first line is selected as the reference line.

Furthermore, a target line is selected in step S1305. The target line is a line other than the reference line. In step S1305, one of lines other than the reference line, which is closest to the first line (second line in FIG. 11) is selected as the target line to be processed.

In step S1306, the distances 1101 and 1102 are respectively calculated as distances d1 and d2. That is, the distances between the right edges of circumscribing rectangles in the reference line and those in the target line are calculated as d1 and d2. If data to be embedded is 1, the change process of the sizes and/or positions of circumscribing rectangles B2, B3, and the like is executed to satisfy d1>d2; if data to be embedded is 0, the change process is executed to satisfy d1<d2. In this embodiment, the change process is not applied to the circumscribing rectangles in the reference line. Also, upon execution of the control process that changes the position and/or size of the circumscribing rectangle, the position and/or size of a character circumscribed by the circumscribing rectangle are/is similarly changed accordingly.

If it is determined in step S1310 that data to be embedded still remains, the flow returns to step S1305. In this case, it is checked in step S1305 if the target line includes unused circumscribing rectangles. In the example of FIG. 11, the circumscribing rectangles used in the target line, i.e., the line including circumscribing rectangles B1 to B4 are B2 and B3. Since B1 is not used as a rectangle to be processed, only B4 is an unused circumscribing rectangle in practice. In this embodiment, when two or more unused circumscribing rectangles remain, the target line remains unchanged. However, when the number of unused circumscribing rectangles is less than 2, the target line is changed.

In the example of FIG. 11, since the number of unused circumscribing rectangles is one, the target line is shifted downward by one, and the third line, i.e., a line including circumscribing rectangles C1 to C7, is selected as a new target line in step S1305. Hence, the distances 1103 and 1104 are respectively calculated as d1 and d2 in step S1306. That is, the distances between the right edges of circumscribing rectangles in the reference line and those in the target line are calculated as d1 and d2. Then, the above processes are repeated for all lines after the second line.

With the above processes, although digital watermark data cannot be embedded in the reference line, even when lines have different numbers of circumscribing rectangles, a larger number of circumscribing rectangles can be used compared to the above embodiment, thus efficiently embedding a digital watermark.

Figure 14:
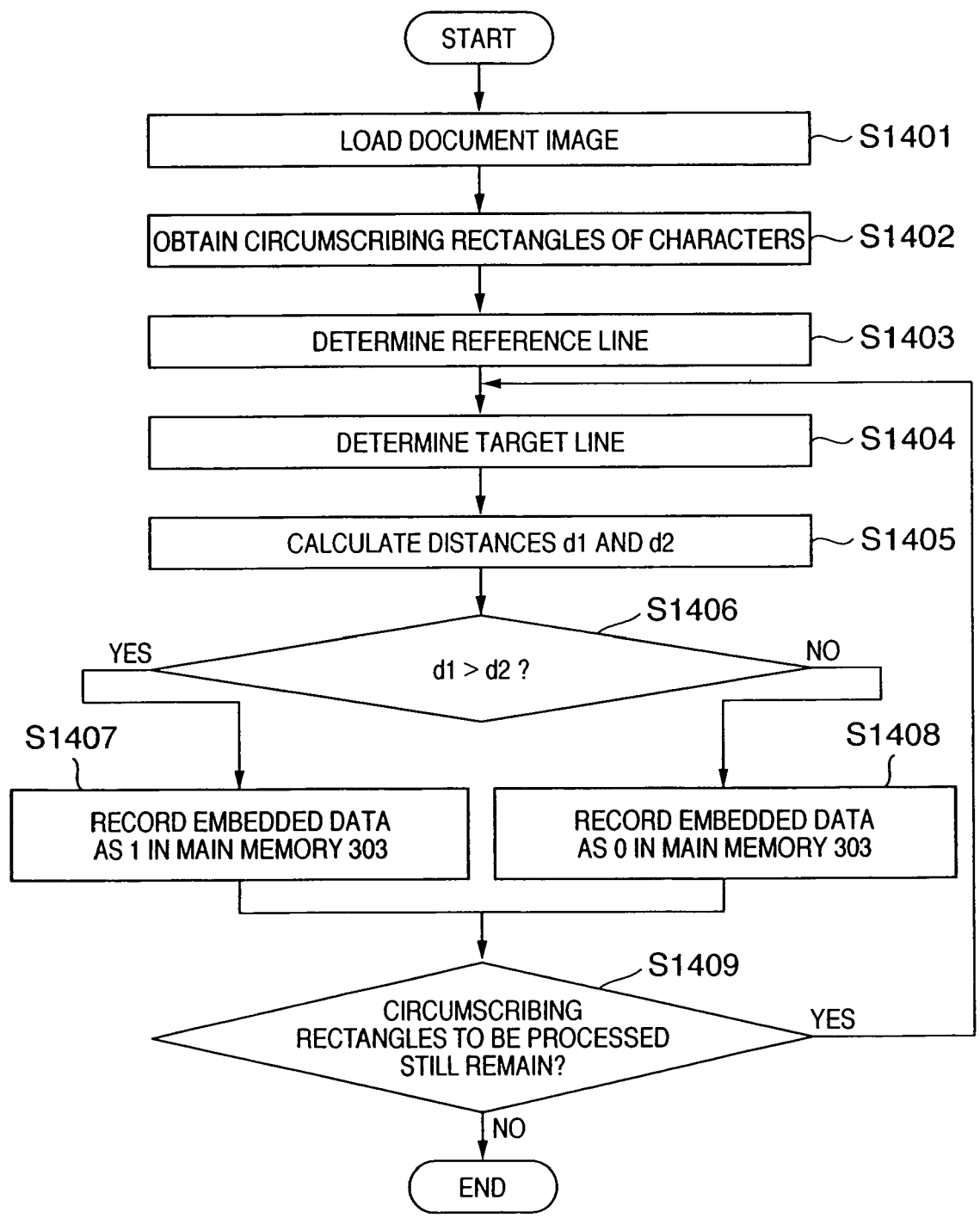
FIG. 14 is a flow chart of the digital watermark extraction process according to the fourth embodiment of the present invention.

The method of extracting digital watermark data from a document image in which digital watermark data is embedded according to the aforementioned digital watermark embedding method is basically the same as the first embodiment except for the method of selecting distances d1 and d2 (the method of selecting d1 and d2 in the aforementioned digital watermark embedding process). FIG. 14 is a flow chart of the digital watermark extraction process according to this embodiment. Also, the process for extracting a digital watermark data sequence is executed by the computer (MPU 302) shown in FIG. 3.

Since the processes in steps S1401 and S1402 are the same as those in steps S500 and S501, a description thereof will be omitted. Also, in steps S1403 to S1405, the reference line and target line are determined, and d1 and d2 are calculated using circumscribing rectangles in these lines as in steps S1304 to S1306. In step S1406 and subsequent steps, the same processes as those in step S503 and subsequent steps are executed.

Furthermore, it is determined in step S1404 if the target line includes unused circumscribing rectangles (in this embodiment, if two or more unused circumscribing rectangles remain, the target line remains unchanged; if the number of unused circumscribing rectangles is less than 2, the target line is changed). With this process, data embedded by the digital watermark embedding process according to this embodiment can be extracted.

The position of the reference line may be given as a key upon extracting a digital watermark. In this case, circumscribing rectangles need not be counted for respective lines in step S1403, and the reference line can be determined based on this key.

In order to obtain distances d1 and d2 in this embodiment, the distances between the right edges of circumscribing rectangles which are shifted one each in the column direction are calculated. However, the present invention is not limited to this, and the circumscribing rectangles may be shifted two or more each.

In this embodiment, after the distances 1101 and 1102 are calculated, the third line is selected as the target line. Alternatively, after the distances 1101 and 1102 are calculated, the distance 1102 may be selected as d1, and the distance between the right edges of A3 and B4 may be calculated as d2. Then, another digital watermark data may be embedded using these d1 and d2 to embed more data.

Fifth Embodiment

In the fourth embodiment, digital watermark data cannot be embedded in the reference line, as described above. This embodiment allows to embed digital watermark data in all lines even when respective lines have different numbers of circumscribing rectangles, as exemplified in FIG. 11. Note that the digital watermark embedding method according to this embodiment is executed by the MPU 302 in the apparatus with the arrangement shown in FIG. 3 as in the first embodiment. In addition, the same techniques as those in the first embodiment are basically used unless otherwise specified.

Figure 12:
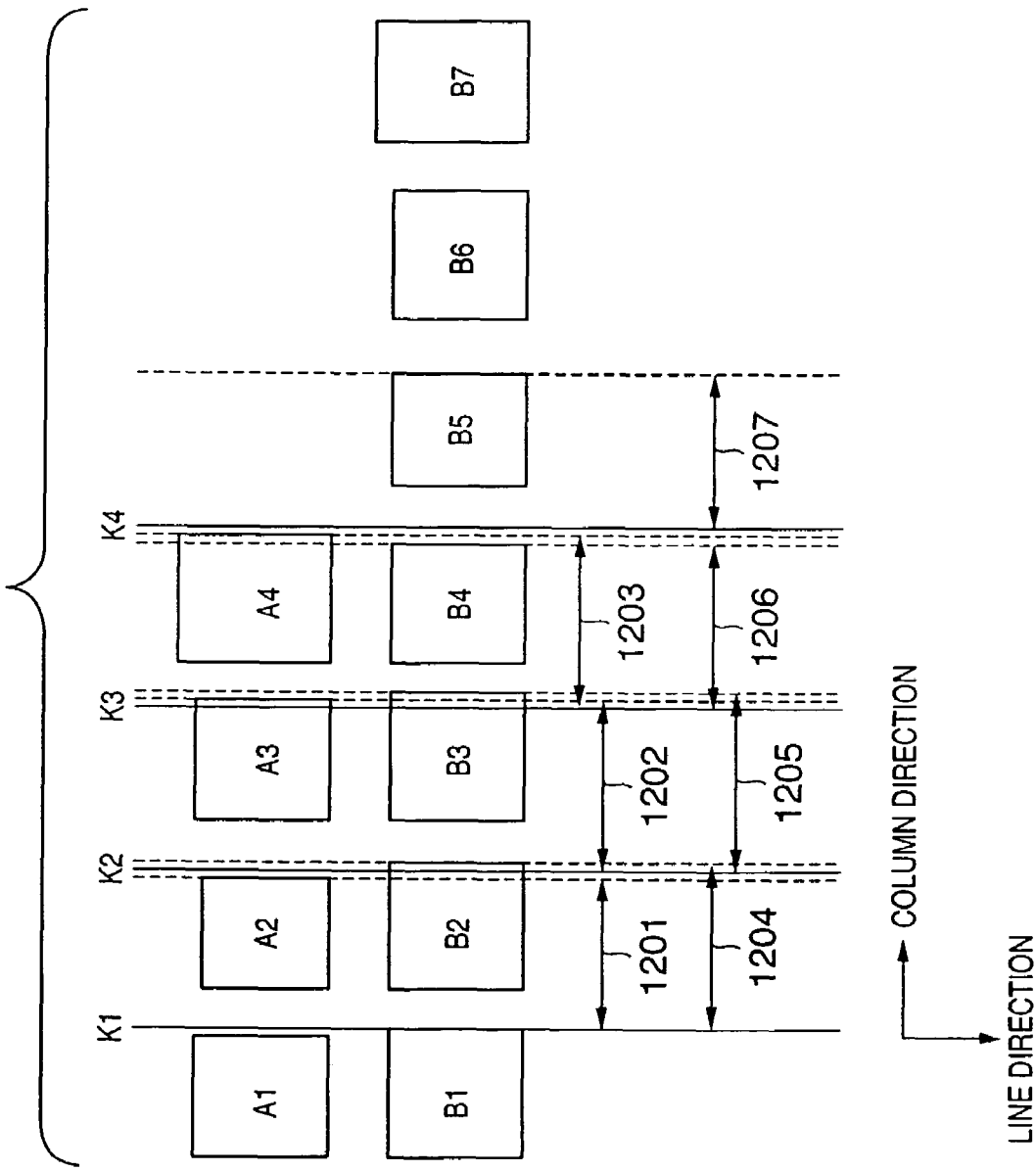
FIG. 12 is a view for explaining a digital watermark embedding method according to the fifth embodiment of the present invention.

FIG. 12 is a view for explaining the digital watermark embedding process according to this embodiment. Referring to FIG. 12, circumscribing rectangles A1 to A4 and B1 to B7 are arranged in respective lines. Also, K1, K2, K3, and K4 are references set at given intervals. Pitches between K1 and K2, K2 and K3, and K3 and K4 will be respectively referred to as basic pitches in this embodiment. Note that this basic pitch is the average value of the distances between the right edges of circumscribing rectangles in all lines, but may be obtained by other calculations.

Also, in FIG. 12, reference numeral 1201 denotes a distance from K1 to the right edge of A2; 1202, a distance from K2 to the right edge of A3; 1203, a distance from K3 to the right edge of A4; 1204, a distance from K1 to the right edge of B2; 1205, a distance from K2 to the right edge of B3; 1206, a distance from K3 to the right edge of B4; and 1207, a distance from K4 to the right edge of B4. The digital watermark embedding method according to this embodiment will be described below taking FIG. 12 as an example.

The flow chart of the digital watermark embedding process according to this embodiment basically follows the flow shown in FIG. 4, but which distances are to be calculated as d1 and d2 in step S403 is different from the above embodiment. In this embodiment, the average value of the distances between circumscribing rectangles in respective lines is calculated in step S403, and is stored in the main memory 303, HDD 304, or the like as the basic pitch. This basic pitch is also used as key information upon extracting a digital watermark.

In step S403, the distances between the references (K1, K2, K3, and K4 in FIG. 12), which are determined based on the basic pitch and are set between neighboring circumscribing rectangles in the column direction in the first line, and the right edges of circumscribing rectangles, each of which appears immediately after the reference, are calculated. In the example of FIG. 12, the distances 1201 and 1202 are calculated as d1 and d2

If data to be embedded is 1, the change process of the sizes and/or positions of circumscribing rectangles A2 and A3 is executed to satisfy d1>d2; if data to be embedded is 0, the change process is executed to satisfy d1<d2. Also, upon execution of the control process that changes the position and/or size of the circumscribing rectangle, the position and/or size of a character circumscribed by the circumscribing rectangle are/is similarly changed accordingly.

If it is determined in step S407 that data to be embedded still remains, the flow returns to step S403. In this case, it is checked in step S403 if the line to be processed includes unused circumscribing rectangles. In the example of FIG. 12, in the lines including circumscribing rectangles A1 to A4, circumscribing rectangles A2 and A3 are used. Since A1 is not used as an object to be processed, only A4 is an unused circumscribing rectangle in practice. In this embodiment, when two or more unused circumscribing rectangles remain, only the line to be processed is successively used; when the number of circumscribing rectangles is less than 2, the next line is also selected as a line to be processed.

That is, in the example of FIG. 12, a line including B1 to B7 is also selected as a line to be processed to calculate the distances 1203 and 1204 as d1 and d2, thus repeating the subsequent processes.

With the above processes, even when lines have different numbers of circumscribing rectangles, digital watermark data can be embedded in all the lines.

The method of extracting digital watermark data from a document image in which digital watermark data is embedded according to the aforementioned digital watermark embedding method is basically the same as the first embodiment except for the method of selecting distances d1 and d2 (the method of selecting d1 and d2 in the aforementioned digital watermark embedding process). That is, the process according to the flow chart shown in FIG. 5 is executed. In step S502, the basic pitch may be calculated as in step S403, or the basic pitch calculated upon embedding may be loaded from the HDD 304 or the like as a key. Then, the distances between the references (K1, K2, K3, and K4 in FIG. 12), which are determined based on the basic pitch and are set between neighboring circumscribing rectangles in the column direction, and the right edges of circumscribing rectangles, each of which appears immediately after the reference, are calculated. In the example of FIG. 12, the distances 1201 and 1202 are calculated as d1 and d2

Furthermore, it is determined in step S502 if the line to be processed includes unused circumscribing rectangles (in this embodiment, if two or more unused circumscribing rectangles remain, the line to be processed is successively used; if the number of unused circumscribing rectangles is less than 2, the next line is also selected as the line to be processed). With this process, data embedded by the digital watermark embedding process according to this embodiment can be extracted.

In this embodiment, when the entire document image is enlarged or reduced in size, extraction of information may be disabled since the method of this embodiment uses comparison with a fixed value, i.e., the basic pitch, in place of relative comparison of distances unlike in the above embodiments. However, when an information sequence upon embedding is random, i.e., when 1 and 0 have equivalent probabilities of occurrence, since the average value upon embedding may equal that upon extraction, the average of the distances between the right edges of circumscribing rectangles upon embedding is expected to be nearly equal to that upon extraction.

Therefore, when the average value is used as the basic pitch, a process for calculating the distances between the right edges of circumscribing rectangles and then calculating their average may be executed in place of storing the basic pitch. Randomization of an information sequence can be easily realized by an encryption process of information to be embedded. In order to absorb offsets of the probabilities of occurrence of 1 and 0 in the information sequence to be embedded, several circumscribing rectangles at the end of a document or line may be used to correct such offset in place of using all circumscribing rectangles. That is, for example, when an information sequence to be embedded in one line includes "1"s 2 bits more than "0"s, the distances between circumscribing rectangles up to these "1" bits become larger than the average, but the distance between the subsequent two circumscribing rectangles can be set to be smaller than the average to correct the total length of the line. Note that no information is normally embedded in last several circumscribing rectangles. When the embedding and extraction sides share information indicating that correction information is embedded, the extraction side does not extract any information from last several circumscribing rectangles.

Sixth Embodiment

In the fifth embodiment, two circumscribing rectangles are used to embed 1-bit data. The digital watermark embedding method according to this embodiment embeds 1-bit data using one circumscribing rectangle. Note that the digital watermark embedding method according to this embodiment is executed by the MPU 302 in the apparatus with the arrangement shown in FIG. 3 as in the first embodiment. In addition, the same techniques as those in the first embodiment are basically used unless otherwise specified.

Taking FIG. 12 as an example, the positions and/or sizes of, e.g., A2 and A3 are changed to embed 1-bit data in the fifth embodiment. That is, two circumscribing rectangles are used to embed 1-bit data. In this embodiment, the distance 1201 is calculated as d1, and the basic pitch as d2. If data to be embedded is 1, the process for changing the position or size of circumscribing rectangle A2 is executed to satisfy d1>d2; if data to be embedded is 0, that process is executed to satisfy d1<d2. In this way, 1-bit data can be embedded using one circumscribing rectangle.

The flow chart of the digital watermark embedding process according to this embodiment basically follows the flow shown in FIG. 4, but which distances are to be calculated as d1 and d2 in step S403 is different from the above embodiment. In this embodiment, distance d2 need not be calculated every process since it is a fixed value. Since distance d2 is the basic pitch, it may be held in the main memory 303 or HDD 304 as a key, as described above.

Also, the method of extracting digital watermark data from a document image in which digital watermark data is embedded according to the aforementioned digital watermark embedding method is basically the same as the first embodiment except for the method of selecting distances d1 and d2 (the method of selecting d1 and d2 in the aforementioned digital watermark embedding process).

That is, the basic pitch is calculated as in the fifth embodiment, or the key is acquired to be set as distance d2. Also, d1 is changed for each data to be embedded like the distance 1201, distance 1202, distance 1203, . . . taking FIG. 12 as an example.

After that, the same processes as in the first embodiment are executed to extract data embedded by the digital watermark embedding process according to this embodiment.

However, when the entire document image is enlarged or reduced in size, extraction of information may be disabled since this method also uses comparison with a fixed value, i.e., the basic pitch, in place of relative comparison of distances unlike in the above embodiments. However, such difficulty can be coped with by making randomization like in the fifth embodiment.

Another Embodiment

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit. When the present invention is applied to the storage medium, that storage medium stores the program codes corresponding to the aforementioned flow charts.

Also, the storage medium includes communication media such as communication cables used in networks such as the Internet, LAN, and the like. That is, when the program codes of the aforementioned embodiments are held in a server apparatus on a network, a program can be installed in a computer by downloading that program from the server apparatus to the computer via the network. Hence, the installed program is executed by a control circuit such as a CPU, MPU, or the like on the computer and, as a result, the computer can implement the functions of the aforementioned embodiments. Therefore, the aforementioned storage medium includes the communication media such as communication cables used in the networks.

As many apparently widely different embodiments of the present invention can be made without departing from the spirit and scope thereof, it is to be understood that the invention is not limited to the specific embodiments thereof except as defined in the claims.

What is claimed is:

1. An apparatus for embedding a digital watermark in a document image, comprising:
   outer shape detection means for detecting circumscribing outer shapes of characters in the document image, said outer shapes including a first outer shape, a second outer shape that neighbors the first outer shape, and a third outer shape that neighbors the second outer shape;
   reference calculation means for setting a plurality of reference lines, said reference lines extending in a column direction and being spaced apart by a basic pitch in a row direction, said reference lines including a first reference line located between the first outer shape and the second outer shape, and a second reference line located between the second outer shape and the third outer shape; and
   control means for controlling at least one of the second and third outer shapes so that a distance between the first reference line and an edge of the second outer shape is different from a distance between the second reference line and an edge of the third outer shape, in accordance with digital watermark information to be embedded.

2. An apparatus according to claim 1, wherein said control means performs control by changing a position of at least one of the second and the third outer shapes, and by performing a corresponding change to a position of a character circumscribed by the changed outer shape.

3. An apparatus according to claim 1, wherein said control means performs control by changing a size of at least one of the second and third outer shapes, and by performing a corresponding change to a size of a character circumscribed by the changed outer shape.

4. An apparatus according to claim 1, wherein the basic pitch is calculated as the average value of the distances between circumscribing outer shapes.

5. A method for embedding a digital watermark in a document image, comprising:
   an outer shape detection step of detecting circumscribing outer shapes of characters in the document image, said outer shapes including a first outer shape, a second outer shape that neighbors the first outer shape, and a third outer shape that neighbors the second outer shape;
   a reference calculation step of setting a plurality of reference lines, said reference lines extending in a column direction and being spaced apart by a basic pitch in a row direction, said reference lines including a first reference line located between the first outer shape and the second outer shape, and a second reference line located between the second outer shape and the third outer shape; and
   a control step of controlling at least one of the second and third outer shapes so that a distance between the first reference line and an edge of the second outer shape is different from a distance between the second reference line and an edge of the third outer shape, in accordance with digital watermark information to be embedded.

6. A program, embodied in a computer-readable memory, for making a computer execute a method of claim 5.

7. A method according to claim 5, wherein said control step performs control by changing a position of at least one of the second and the third outer shapes, and by performing a corresponding change to a position of a character circumscribed by the changed outer shape.

8. A method according to claim 5, wherein said control step performs control by changing a size of at least one of the second and third outer shapes, and by performing a corresponding change to a size of a character circumscribed by the changed outer shape.

9. A method according to claim 5, wherein the basic pitch is calculated as the average value of the distances between circumscribing outer shapes.

10. An apparatus for extracting data embedded in a document image, comprising:
    outer shape detection means for detecting circumscribing outer shapes of characters in the document image, said outer shapes including a first outer shape, a second outer shape that neighbors the first outer shape, and a third outer shape that neighbors the second outer shape;
    reference calculation means for setting a plurality of reference lines, said reference lines extending in a column direction and being spaced apart by a basic pitch in a row direction, said reference lines including a first reference line located between the first outer shape and the second outer shape, and a second reference line located between the second outer shape and the third outer shape; and
    extraction means for comparing a first distance, between the first reference line and an edge of the second outer shape, to a second distance, between the second reference line and an edge of the third outer shape, and extracting data corresponding to a comparison result of the distances as data embedded using the first and second distances.

11. A method for extracting data embedded in a document image, comprising:
- an outer shape detection step of detecting circumscribing outer shapes of characters in the document image, said outer shapes including a first outer shape, a second outer shape that neighbors the first outer shape, and a third outer shape that neighbors the second outer shape;
- a reference calculation step of setting a plurality of reference lines, said reference lines extending in a column direction and being spaced apart by a basic pitch in a row direction, said reference lines including a first reference line located between the first outer shape and the second outer shape, and a second reference line located between the second outer shape and the third outer shape; and
- an extraction step of comparing a first distance, between the first reference line and an edge of the second outer shape, to a second distance, between the second reference line and an edge of the third outer shape, and extracting data corresponding to a comparison result of the distances as data embedded using the first and second distances.

12. A program, embodied in a computer-readable memory, for making a computer execute a method of claim 11.

* * * * *

UNITED STATES PATENT AND TRADEMARK OFFICE
CERTIFICATE OF CORRECTION

PATENT NO. : 7,269,274 B2
APPLICATION NO. : 10/727637
DATED : September 11, 2007
INVENTOR(S) : Keiichi Iwamura et al.

It is certified that error appears in the above-identified patent and that said Letters Patent is hereby corrected as shown below:

Col. 10, line 50, "sets" should read --sets,--.

line 51, "rectangles" should read --rectangles,--.

Col. 11, line 62, "and" second occurrence should read --and are--.

Col. 12, line 19, "taken" should read --taking--.

Signed and Sealed this

Twenty-seventh Day of May, 2008

JON W. DUDAS
*Director of the United States Patent and Trademark Office*